No. 649,004. Patented May 8, 1900.
E. F. STECK.
FIRE EXTINGUISHER.
(Application filed Sept. 28, 1899.)
(No Model.)
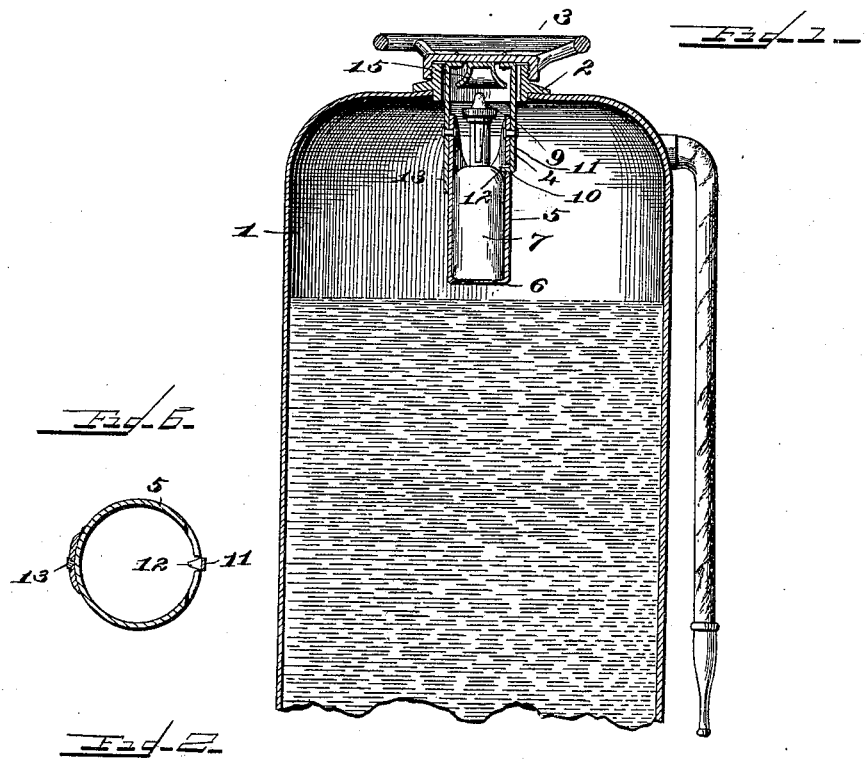
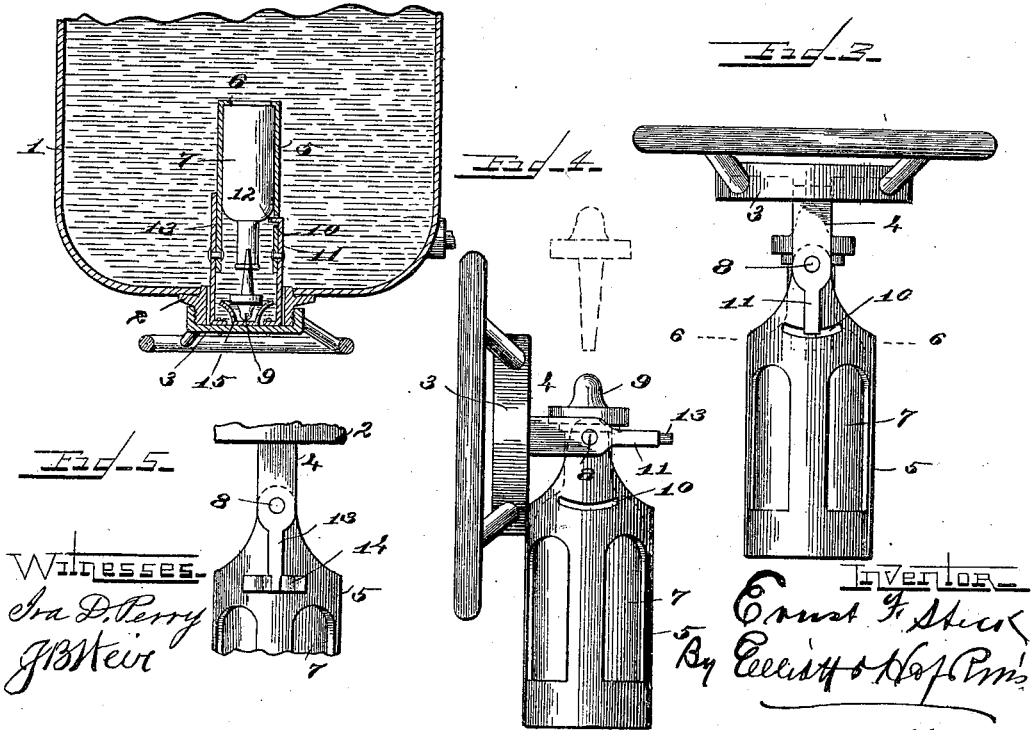

UNITED STATES PATENT OFFICE.

ERNST F. STECK, OF CHICAGO, ILLINOIS, ASSIGNOR TO THE FIRE EXTINGUISHER MANUFACTURING COMPANY, OF NEW YORK, N. Y.

FIRE-EXTINGUISHER.

SPECIFICATION forming part of Letters Patent No. 649,004, dated May 8, 1900.

Application filed September 28, 1899. Serial No. 731,901. (No model.)

*To all whom it may concern:*

Be it known that I, ERNST F. STECK, a citizen of the United States, residing at Chicago, in the county of Cook and State of Illinois, have invented certain new and useful Improvements in Fire-Extinguishers, of which the following is a full, clear, and exact specification.

My invention relates to fire-extinguishers, and the improvements have more especial reference to bottle holders or baskets for chemical fire-extinguishers of that class in which the same bottle is used repeatedly.

The primary object of my invention is to provide a bottle basket or holder of such a construction that the bottle will be securely held in place during the operation of the apparatus, and when the basket is removed from the tank the bottle may be readily refilled while resting in the basket, or, if desired, may be removed from the basket.

A further object of my invention is to accomplish the foregoing results without necessarily employing screw-threads for connecting the members of the basket together.

With these ends in view my invention consists in certain features of novelty in the construction, combination, and arrangement of parts by which the said objects and certain other objects hereinafter appearing are attained, all as fully described, with reference to the accompanying drawings, and more particularly pointed out in the claims.

In the said drawings, Figure 1 is a vertical sectional view of a portable fire-extinguisher provided with my improvements. Fig. 2 is a similar view showing the extinguisher inverted and in operation. Fig. 3 is an enlarged side elevation of the basket-holder and the closing-cap. Fig. 4 is a similar view showing the hinged bail of the basket turned down to permit the refilling of the bottle, the bottle-stopper being shown removed in dotted lines. Fig. 5 is a fragmentary view showing the opposite side to that presented in Figs. 3 and 4; and Fig. 6 is a transverse section taken on the line 6 6, Fig. 3.

1 represents the tank of a portable fire-extinguisher, having the usual threaded neck 2, closed by a screw-cap 3, and from which latter the basket for holding the chemical-bottle is usually suspended.

In carrying out my invention I secure to the under side of this cap 3 a pair of hangers 4, which constitute the bail of a basket or bottle holder 5, having a bottom flange 6, upon which rests the chemical-bottle 7, as usual. The arms or hangers 4, however, are pivoted at 8 to opposite sides of the basket proper, 5, so as to constitute a hinge connection between the basket and its bail, and thereby permit the cap 3 to be turned down in the position shown in Fig. 4 after it has been unscrewed from the neck 2 and removed from the tank, thus enabling the refilling of the bottle 7 without removing it from its basket 5.

When the extinguisher is not in use, the bottle-basket of course hangs perpendicularly from its bail 4 in the position shown in Fig. 1 and is closed by the usual stopper 9, and when the extinguisher is in operation it stands in a perpendicular direction, as shown in Fig. 2. In order now that the bottle may not slip down in its basket when the extinguisher is inverted and yet may be free to be removed from the basket when the latter is withdrawn from the tank, I provide the side of the basket with a curved slot 10 and one of the arms or hangers 4 with a depending portion 11, having an inturned lug 12, which projects through this curved slot 10 when the bail of the basket is turned straight with the basket and engages with the shoulder of the bottle, as clearly shown in Figs. 1 and 2, thus preventing the bottle from slipping downwardly in its basket when the extinguisher is inverted.

In order to prevent the basket from turning on its hinges when the extinguisher is inverted, I provide a lock, which automatically secures the two members of the basket—*i. e.,* the bail 4 and basket proper, 5—together when they are in their normal position, as shown in Fig. 5. This lock consists of a friction-hold composed of two members, one of which is in the form of a depending projection 13 on the other one of the hangers 4 and which constitutes a latch, while the other one of these friction-hold members consists of a notched catch 14, secured to the side of the basket proper and adapted to receive the beveled end of the catch 13, which is composed of spring material, when the bail and the basket are alined, as shown in Fig. 5, and thus hold them in alinement, but not so rigidly that they may not be turned on the hinge, as shown in Fig. 4, when desired.

When the apparatus is inverted, the end of the stopper 9 falls into a stopper-guide 15, carried on the under side of the cap 3 and serving to prevent the stem of the stopper from losing its place in the neck of the bottle.

Having thus described my invention, what I claim as new therein, and desire to secure by Letters Patent, is—

1. In a fire-extinguisher the combination of a tank, a chemical-bottle, a two-part bottle basket or holder located in said tank and having its members hinged together near the upper end of the bottle in said bottle-basket and means operated by the movement of one of said members for holding the bottle in place in the other member, substantially as set forth.

2. In a fire-extinguisher the combination of a tank, a chemical-bottle, a bottle-basket having a hinged bail provided with a projection adapted to come against a part of the bottle when the bail is in its normal position, for holding the bottle in place when the tank is inverted, substantially as set forth.

3. In a fire-extinguisher the combination of a tank, a chemical-bottle, a two-part bottle basket or holder one of which parts is provided with a slot and the other with a projection adapted to enter said slot and engage with the bottle when the members of the basket are in their normal position, substantially as set forth.

4. In a fire-extinguisher the combination of a tank, the cap 3 having the stopper-guide 15 on the under side thereof, the hangers 4 depending from said cap and having the projections 11 and 13 respectively, the lug 12 on the projection 11, a basket hinged to said hangers 4 and having the slot 10 for receiving the lug 12, a bottle in said basket engaged by said lug 12, the catch 14 on said basket for engaging the projection 13 and the stopper 9, substantially as set forth.

ERNST F. STECK.

Witnesses:
EDNA B. JOHNSON,
F. A. HOPKINS.